Figure 1:
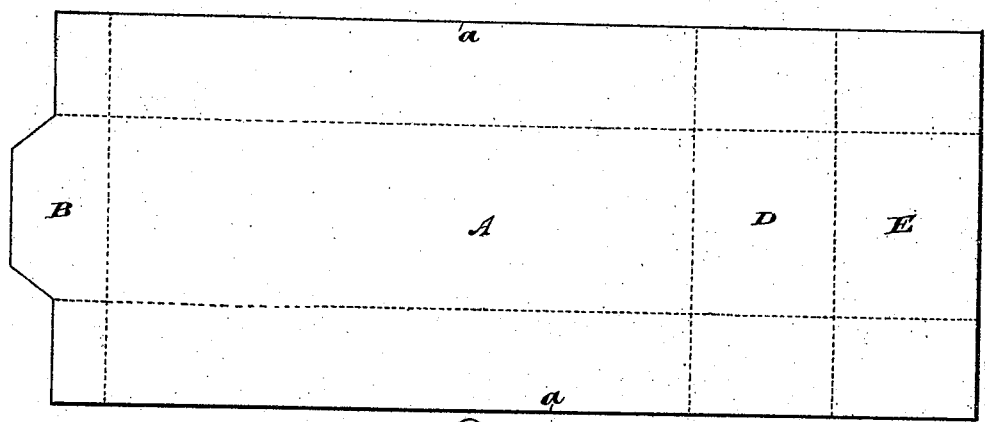

No. 847,730. PATENTED MAR. 19, 1907.
W. E. COLWELL.
PHOTOGRAPHIC APPARATUS.
APPLICATION FILED MAR. 26, 1906.

2 SHEETS—SHEET 1.

Witnesses.
F. McDermott
L. G. Sharpe

Inventor.
W. E. Colwell
by Egerton R. Case
Atty.

THE NORRIS PETERS CO., WASHINGTON, D. C.

No. 847,730. PATENTED MAR. 19, 1907.
W. E. COLWELL.
PHOTOGRAPHIC APPARATUS.
APPLICATION FILED MAR. 26, 1906.
2 SHEETS—SHEET 2.
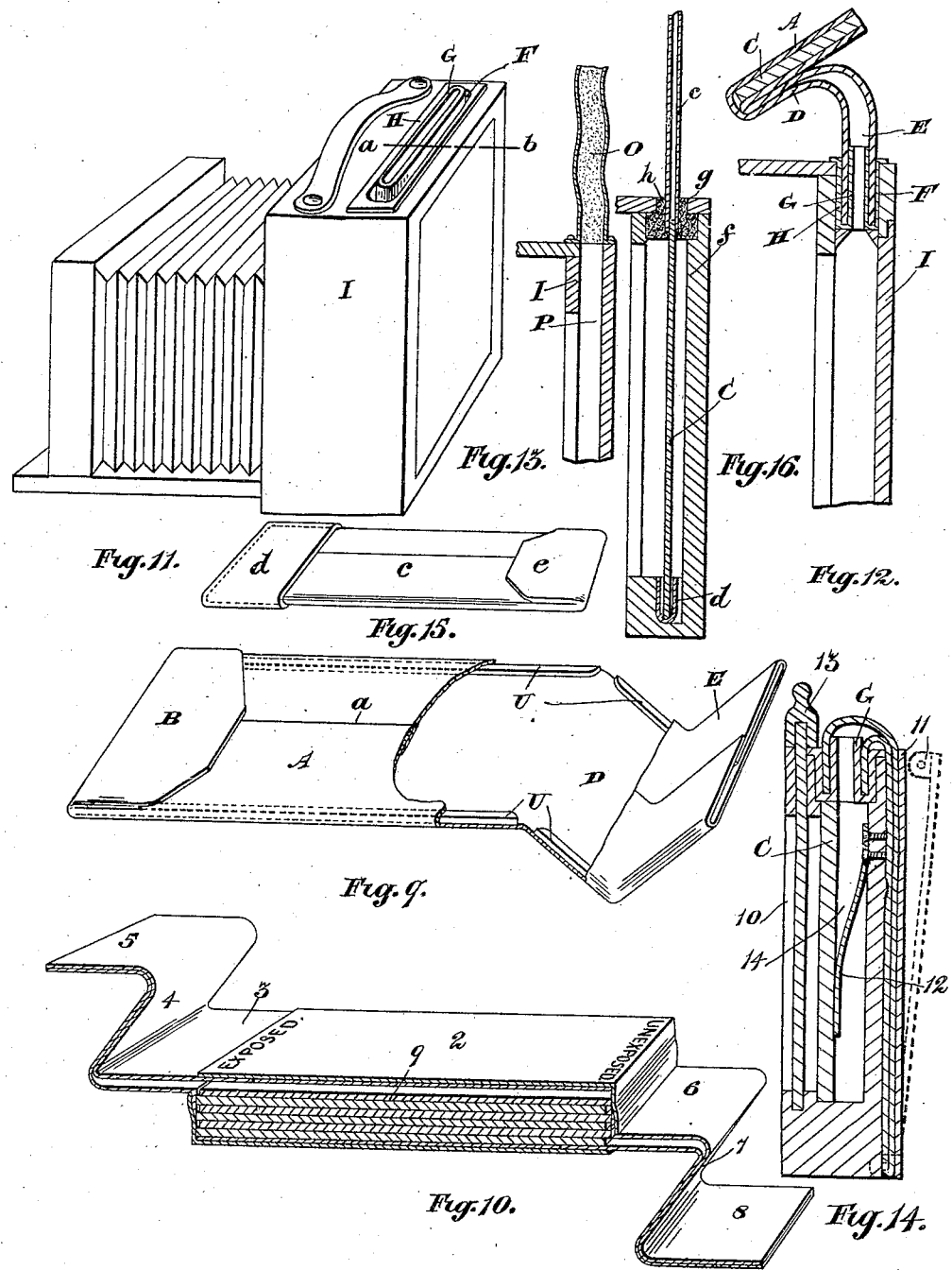

UNITED STATES PATENT OFFICE.

WALTER ERNEST COLWELL, OF OAKVILLE, ONTARIO, CANADA.

PHOTOGRAPHIC APPARATUS.

No. 847,730.　　　Specification of Letters Patent.　　Patented March 19, 1907.

Application filed March 26, 1906. Serial No. 308,156.

*To all whom it may concern:*

Be it known that I, WALTER ERNEST COLWELL, a subject of the King of Great Britain, residing in the town of Oakville, in the county of Halton, in the Province of Ontario, Canada, have invented certain new and useful Improvements in Photographic Apparatus, of which the following is a specification.

My invention relates to improvements in photographic apparatus; and the objects of my invention are, first, to provide a simple and inexpensive container for photographic dry-plates which will enable a large number of such dry-plates to be carried without taking up much more room than that actually required by the plates themselves; secondly, to provide a simple means of transferring said dry-plates from said container into any suitable chamber, such as a camera or plate-holder, and back again without admitting any light which might be injurious to said dry-plate and without injuring or destroying such container; thirdly, to enable photographic dry-plates to be handled singly both before and after exposure and in such way as to minimize the danger of such mistakes as taking two or more pictures on one plate; fourthly, to provide a simple means of loading and unloading plate-cameras by daylight as readily as may be done with those using films; fifthly, to dispense with the plurality of plate-holders usually necessary when a large number of plates are to be carried, and thereby to reduce the expense of photographic outfits; sixthly, in one form of my invention to dispense with the use of plate-holders in connection with a plate-camera; seventhly, to provide a daylight loading and unloading system which will be applicable to standard cameras such as are at present in use by the mere addition of a special plate-holder adapted for use with my containers; eighthly, in one form of my invention to provide a magazine envelop or container for a plurality of dry-plates from which a plate may be passed into a camera or plate-holder and returned thereinto without admitting light which might be injurious to the plates, the construction being such that the exposed plates are readily kept separated from the unexposed and may be removed separately for development without interfering one with the other; ninthly, to provide a simple means of labeling and identifying dry-plates after exposure; tenthly, to provide a means of storing the negatives after development in such a manner as to prevent scratching and to provide a means of recording such data as to each negative as may be necessary or convenient; and it consists in making an envelop or container for the plate out of material impervious to actinic rays or any other light-rays that would be injurious to sensitized plates of glass, celluloid, or any other material and so constructing said envelop or container that said sensitized plate may be freely passed thereinto and thereoutof without injury to the plate and without injury to itself—that is to say, without rupturing or destroying either the whole or any portion thereof of said envelop or container, so that same may be used as often as desired.

My invention further consists in constructing a camera or plate-holder so that the plate may be passed thereinto from said envelop or container or therefrom back into said envelop or container without any possible chance of injury to said plate, as hereinafter particularly explained.

Figures 2, 3, 5:
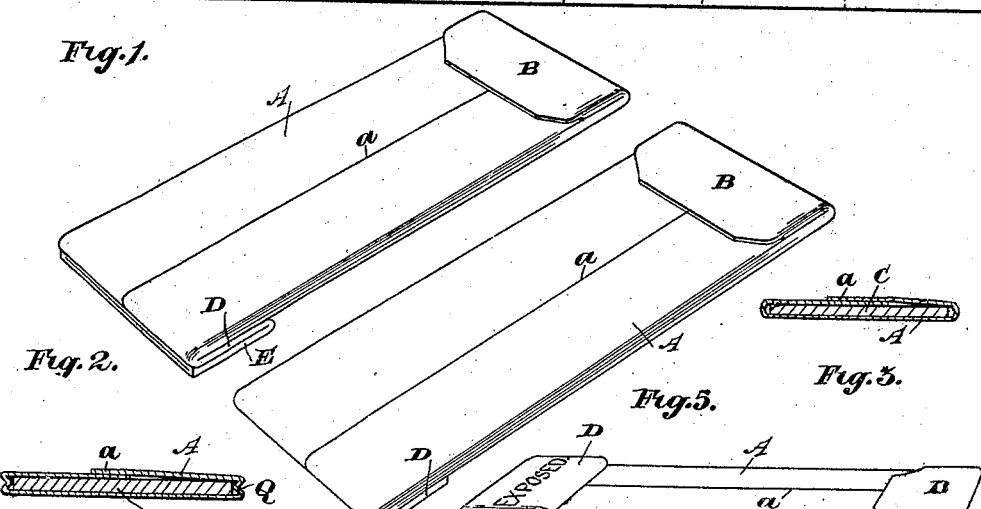
Figures 4, 8:
Figure 6:
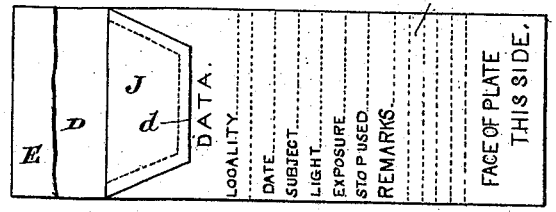
Figure 7:
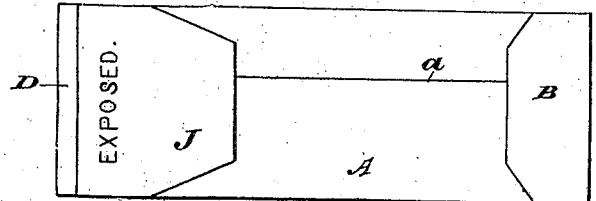

Figure 1 is a plan view of a piece of material before same is folded into shape to constitute my preferred form of envelop or container. Fig. 2 is a perspective view of my preferred form of envelop or container. Fig. 3 is a transverse cross-section through Fig. 2. Fig. 4 is a perspective view of my preferred form of envelop or container, showing same sealed after the plate held therein has been exposed. Fig. 5 is a perspective view of an alternative form of my envelop or container. Figs. 6 and 7 are respectively front and back views of my preferred form of envelop or container, showing same provided with a sealing-flap. Fig. 8 is a transverse cross-section through another alternative form of my envelop or container. Fig. 9 is a perspective view, partly in section, of an alternative form of my envelop or container. Fig. 10 is a perspective view of a still further alternative form of my envelop or container, showing same constructed to contain a plurality of plates or films. Fig. 11 is a perspective view of a camera constructed according to my preferred form of invention therefor for passing a plate or film from its envelop or container to and from the camera. Fig. 12 is a vertical cross-section on the line *a b*, Fig. 11, showing an envelop or container coupled to the camera. Fig. 13 is a horizontal cross-section through portion of a camera, showing an alternative form of construction for the conductor. Fig. 14 is a vertical section through a plate-holder constructed according to my invention. Fig. 15 is a perspective view of a still further form of envelop or container embodying my invention; and Fig. 16 is a vertical cross-section through a camera or plate-holder and also through the alternative form of envelop or container shown in Fig. 15, the parts of this form of container or envelop being separated.

In the drawings like characters of reference indicate corresponding parts in each figure.

The material out of which I make my envelop or container is preferably black paper of the required weight impervious to actinic rays or any other light-rays that would be injurious to sensitized plates; but it will, of course, be understood that same may be made of any suitable material, whether wholly or partially flexible, without departing from the spirit of my invention.

The sheet of material A is folded along the dotted lines shown, and the sides $a$ of same are gummed one over the other and the end B turned down and gummed in the position shown in Fig. 2, thus forming the body portion of my preferred form of envelop or container shown in Fig. 2. In order to prevent any possibility of the actinic rays or any other light-rays that would be injurious to the plate C, held within the envelop, entering thereinto, I provide the end of my preferred form of envelop or container with a double fold composed of the inner portion D and the outer portion E. Upon inspecting the drawings it will be seen that by reason of the folded end of the envelop or container the plate may be freely passed thereinto and thereoutof at will without any possibility of injuring or destroying said envelop or container.

In order to pass the plate from the container or envelop into a camera, the envelop or container is coupled to the camera in such manner as to prevent any possibility of light getting into the camera and into the envelop or container itself and the plate slid therefrom down into the camera by means of any suitable conductor. As soon as the photograph has been taken the plate is slid from the camera back into the envelop or container and the fold secured in place.

According to my preferred form of construction for coupling the envelop or container to a camera for the purpose before described I provide what I call a "conductor" composed of an inner hollow portion G and an outer portion H, between which is a space F. By means of the outer portion H my preferred form of conductor is suitably held in place to the camera. Upon referring to Fig. 12 it will be seen that in order to pass a plate into the camera I the outer portion E of the fold is slipped into the space F, thus making a light-proof joint or union between said envelop or container and the camera. By straightening the envelop or container it will be understood that the plate C, held therein, will be slid therefrom through the conductor down into the camera I. When the photograph has been taken, the plate is returned back into the envelop or container and same withdrawn or disconnected from the camera. In order to show that the envelop or container contains an exposed plate, the fold is bent over into the position shown in Fig. 4 and gummed or otherwise secured in place. By means of the word "exposed" or any other term of the same significance printed or attached to the portion D it will be seen at a glance that the plate within said envelop has been used.

If desired, a sealing-flap J may be secured to the portion D and provided with a gummed edge $d$, so that when the plate has been used the envelop or container may be sealed by gumming said flap J in the position shown in Fig. 7 to the body portion of the envelop or container.

In order to show that my invention may be used in connection with the cameras now on the market, I illustrate in Fig. 14 a suitable plate-holder whereby my envelop or container may be coupled thereto for the purpose before set forth. Any suitable conductor may be used with the plate-holder, and for the convenience of illustration I have shown the same kind of conductor as illustrated in Figs. 11 and 12. The envelop or container is coupled to the conductor G in the manner before described, and in order to keep the body portion of the envelop or container out of the way when the plate-holder 10 is passed into the camera in the usual manner I provide suitable means. According to the construction shown for that purpose, a back 11 is hinged to the plate-holder, and in order to insert the body portion of said envelop or container in place said hinged back is moved into the dotted position shown and moved back into the position shown in full lines after the envelop has been placed between the same and the plate-holder. As will be understood, the plate C has been passed into the chamber 14 of the plate-holder before the body portion of the envelop or container is secured in place. 12 is any suitable spring by means of which the plate C may be held in position. When the plate-holder is passed into the camera, a suitable slide 13 is removed from said plate-holder in order that the plate C may be used. After the plate has been used the slide 13 is shoved back into place and the plate-holder removed from the camera and the plate C removed therefrom back into the envelop or container after the manner before described. Of course before the plate can be moved back into the envelop or container the body portion of said envelop or container must be removed from between the plate-holder and the hinged back 11. It will of course be understood that the spring 12 will not be strong enough to prevent the proper placing of the plate C in order to pass it out of the plate-holder through the conductor.

In place of the conductor shown in Figs. 11, 12, and 14 I show an alternative form of same in Fig. 13. When using this alternative form of conductor, (which is suitably secured to the camera or plate-holder, so as to connect with the plate-chambers P and 14 therein,) it will be understood that the envelop or container will be passed inside of said conductor O, which is preferably flexible.

Upon referring to Fig. 5 it will be seen that, if desired, I may use a folded end for the envelop or conductor composed of only one portion D; but I prefer to use the double fold before described, because there is less danger of light reaching the plate.

According to the alternative form of envelop or container shown in Fig. 8, it will be noticed that the sides of same are provided with an infold edge Q, which construction will enable the transverse diameter of said envelop or container to be considerably enlarged, so as to facilitate the passage of a plate thereinto or thereoutof in case same should bind.

In the alternative form of envelop or container shown in Fig. 9 I secure strips U down each side of the body portion and each side of the portion D on the inside of the envelop or container, so as to facilitate the passage of plates into and from said envelop or container.

In the alternative form of my invention shown in Fig. 10 I show same constructed so as to contain a number of plates. The body portion 2 of the magazine envelop or container is provided with an end 3, provided with inner and outer folds 4 and 5, which constitutes the means whereby the plate is passed to and from said magazine envelop or container. As shown in the drawings, one plate is supposed to have been removed from the magazine-envelop 2. When the plate is returned into this magazine envelop or container, it will be passed into same to occupy the vacant position shown. The unexposed plates will be passed through the end 6, which is composed of the inner and outer folds 7 and 8. After this plate has been used it can be passed back into the magazine-envelop 2 through the end 3. By means of a loose sheet 9, made of any suitable material, preferably cardboard, it will be understood that the exposed and unexposed plates will be kept separated. By means of the words "exposed" and "unexposed" suitably placed upon the magazine envelop or container in proximity to the ends 3 and 6 it will be understood into which end the exposed plate must be passed and from which end the unexposed plate must be removed. The form of my invention shown in Fig. 10 is composed substantially of two of the envelops or containers shown in Fig. 2, placed together and with the adjacent sides or portions removed, so as to constitute or form one common chamber.

Upon referring to Fig. 6 it will be seen that I may provide the envelop or container with suitable data relating to the negative therein contained.

The alternative form of container or envelop c (shown in Fig. 15) is provided with a cap d and a sealed end e. The container or envelop c is introduced into the camera or plate-holder f, Fig. 16, through an opening g therein, which is provided with any suitable material, such as felt h, by introducing its capped end thereinto. The plate C therewithin will when the body portion of said container or envelop is slightly jarred or tapped drop down into the position shown in Fig. 16 and carry with it the cap d down into the bottom of the camera or plate-holder f. In order that an exposure may be made on the plate C, the container or envelop c of this alternative form of invention is drawn up approximately into the position shown in Fig. 16. After an exposure is made the container or envelop c is shoved down into the cap d. The felt or other suitable material h will prevent the entry of light down into the camera or plate-holder f, and as there is quite a tight fit between the cap d and the container or envelop c said cap will not be removed from said container or envelop when same is withdrawn from the camera or plate-holder.

It will of course be understood that my invention is susceptible of being embodied in many different forms to those shown, both as regards the envelop or container itself and as regards the means or conductor for passing plates into and from a camera or plate-holder. Therefore it is to be clearly understood that my claims are not to be considered as confining me to the construction shown and described, as my invention is very much broader than the construction or forms shown.

What I claim as my invention is—

1. As a new article of manufacture, a container or envelop made of material impervious to rays of light which cause chemical changes, provided with an end having a double fold whereby free passage may be had thereinto and thereoutof.

2. As a new article of manufacture, a container or envelop made of material impervious to rays of light which cause chemical changes, and having one end permanently closed and the other end folded with a double fold whereby free passage may be had thereinto and thereoutof.

3. As a new article of manufacture, a container or envelop made of material impervious to rays of light which cause chemical changes, and having one end permanently closed and the other end closed by a double fold, whereby free passage may be had thereinto and thereoutof.

4. As a new article of manufacture, a container or envelop made of suitable flexible black material impervious to rays of light which cause chemical changes, means along the edges of said container interior thereof to facilitate the passage of a plate, and having one end permanently closed and the other end closed by a double fold, whereby free passage may be had thereinto and thereoutof.

5. As a new article of manufacture, a container or envelop made of suitable flexible black material impervious to rays of light which cause chemical changes, and having one end permanently closed and the other end closed by a double fold whereby the sensitized plate therewithin may have free passage thereinto and thereoutof, and means located within the container along the edges thereof to facilitate the passage of a plate.

6. The combination with a receptacle for sensitized plates, of a container or envelop made of suitable flexible material impervious to rays of light which cause chemical changes, and having one end permanently closed; a means whereby the other end may be closed in such manner whereby a sensitized plate therewithin may have free passage thereinto and thereoutof, means whereby said container or envelop may be coupled to said receptacle so as to prevent said sensitized plate being injured by light when moved back and forth between said envelop or container and said receptacle, and means within the container to facilitate the passage of a plate therein.

7. The combination with a receptacle for sensitized plates, of a container or envelop made of suitable flexible material impervious to rays of light which cause chemical changes, and having one end permanently closed and the other end closed by a double fold composed of an inner and an outer member; a sensitized plate within said container or envelop, and a conductor provided with a central passage-way and connected with said receptacle so that when the outer member of said fold is coupled to said conductor a light-proof joint is made between said container or envelop and said receptacle.

In testimony whereof I have signed my name to this specification in the presence of two subscribing witnesses.

WALTER ERNEST COLWELL.

Witnesses:
EDITH E. COLWELL,
MARY E. COLWELL.